United States Patent
Kajiura

[11] Patent Number: 6,084,381
[45] Date of Patent: Jul. 4, 2000

[54] INDUCTIVE CHARGER COUPLING

[75] Inventor: Katsuyuki Kajiura, Kariya, Japan

[73] Assignee: Kabushiki Kaisha Toyoda Jidoshokki Seisakusho, Kariya, Japan

[21] Appl. No.: 09/229,282

[22] Filed: Jan. 13, 1999

[30] Foreign Application Priority Data

Jan. 16, 1998 [JP] Japan .................................. 10-006652

[51] Int. Cl.[7] .............................................. H01M 10/46
[52] U.S. Cl. ........................................................ 320/108
[58] Field of Search ........................ 320/108, FOR 101; 336/DIG. 2

[56] References Cited

U.S. PATENT DOCUMENTS

| | | | |
|---|---|---|---|
| 5,434,493 | 7/1995 | Woody et al. . | |
| 5,483,143 | 1/1996 | Hall et al. ................................. | 320/108 |
| 5,506,489 | 4/1996 | Abbott et al. ............................ | 320/108 |
| 5,594,315 | 1/1997 | Ramos et al. ............................ | 320/108 |
| 5,606,237 | 2/1997 | Biasotti et al. .......................... | 320/108 |
| 5,703,462 | 12/1997 | Woody et al. ........................... | 320/108 |
| 5,719,483 | 2/1998 | Abbott et al. ............................ | 320/108 |
| 5,903,134 | 5/1999 | Takeuchi .................................. | 320/108 |

*Primary Examiner*—Edward H. Tso
*Attorney, Agent, or Firm*—Morgan & Finnegan, L.L.P.

[57] ABSTRACT

An inductive charger coupling for charging a battery includes a generally flat charging paddle and a charging receptacle. The charging paddle includes a primary core and a primary coil. The paddle is electrically connected to an external power supply. The charging receptacle includes a secondary core and a secondary coil. The receptacle is electrically connected to the battery. The secondary core engages the primary core when the charging paddle is plugged into the charging receptacle. The paddle lacks corners at its distal end, and the secondary core is shaped to conform to the distal end of the paddle, which narrows the overall width of the coupling.

16 Claims, 9 Drawing Sheets

INDUCTIVE CHARGER COUPLING

BACKGROUND OF THE INVENTION

The present invention relates to an inductive charger coupling for charging batteries such as batteries of battery driven electric vehicles.

A prior art inductive charger coupling 100 for charging the batteries of battery driven electric vehicles is shown in FIGS. 13 to 15. The inductive charger coupling 100 includes a charging receptacle 100a and a flat charging paddle 100b. The receptacle 100a is electrically coupled to the battery (not shown) of the electric vehicle. The paddle 100b is electrically coupled to an external power supply (not shown).

The receptacle 100a includes a housing 110, a ferrite secondary core 120 and a flat secondary coil assembly 130. As shown in FIG. 15, the core 120 includes a right pillar 124a, a left pillar 124b, upper and lower bridge sections 126 and upper and lower inner supports 122. The cross sectional area of each pillar 124a, 124b is chosen to create a desired amount of magnetic flux during the charging operation of the battery. The upper bridge section 126 connects the upper end of the right pillar 124a and the upper end of the left pillar 124b. The lower bridge section 126 connects the lower end of the right pillar 124a and the lower end of the left pillar 124b. Each support 122 has a hollow cylindrical shape and is centrally arranged. The upper support 122 extends downward from the upper bridge section 126. The lower support 122 extends upward from the lower bridge section 126. The flat secondary coil assembly 130 surrounds and is attached to the lower support 122.

As shown in FIGS. 14 and 15, the paddle 100b includes a primary core 142 and a primary coil 140, which has a circular cross section. When the paddle 100b is plugged into the receptacle 100a, the primary core 142 is held between the upper and lower supports 122 of the secondary core 120, and the primary coil 140 is coaxially aligned with the secondary coil assembly 130 without contacting the secondary coil assembly 130. When alternating current is supplied to the primary coil 140 from the external power supply, magnetic flux is created by the primary coil 140. The magnetic flux forms a magnetic circuit, which extends around the secondary core 120, to induce an electromotive force in the secondary coil assembly 130 for generating electric current. The electric current is supplied to the battery through a cable and a rectifier (not shown) for charging.

As shown in FIG. 13, the core 120 of the prior art inductive charger coupling 100 extends straight across the distal arcuate end of the paddle 100b and has a width of 180 mm (as measured vertically in FIG. 13) The right pillar 124a and the left pillar 124b are located outside of the paddle 100b. Therefore, the housing 110 of the receptacle 100a must be relatively wide (200 mm) to accommodate the core 120.

The space available in vehicles is limited, so the relatively large receptacle 100a of the inductive charger coupling 100 is not suitable since the receptacle 100a of the inductive charger coupling 100 reduces the available space for other parts. The large receptacle causes crowding of other parts, which may lead to malfunctions due to radiated heat and other factors and makes maintenance difficult. Therefore, the large inductive charger coupling 100 is disadvantageous, especially, for compact cars.

SUMMARY OF THE INVENTION

The present invention addresses the above disadvantages. It is an object of the present invention to provide a smaller inductive charger coupling.

To achieve the above objective, an inductive coupling for connecting a battery to a power source includes a generally planar charging paddle and a receptacle for receiving the paddle to electrically couple the external power source with the battery. The paddle includes a primary core and a primary coil. The primary coil is wound around the primary core. The primary coil is adapted to connect to an external power supply. The paddle has a proximal end, a distal end, a longitudinal axis, a top surface, a bottom surface, and first and second sides. The first and second sides are farther from the longitudinal axis than the top and bottom surfaces. The paddle extends farther in the distal direction in a region near the longitudinal axis than along the sides. An imaginary polygon is defined by the distal end of the paddle, such that a distal end of the polygon is perpendicular to the longitudinal axis of the paddle and contacts the distal end of the paddle. A pair of sides of the polygon, which intersect the distal end of the polygon, are coextensive with the first and second sides of the paddle, respectively. The receptacle includes a secondary core and a secondary coil. The secondary coil is wound around the secondary core. The secondary core engages the primary core when the paddle is plugged into the receptacle. The receptacle has a pair of pillars extending in a direction generally perpendicular to the paddle when the paddle is plugged in. More than half of the cross sectional area of the pillars, when cut by a plane that includes the longitudinal axis of the paddle when the paddle is plugged in, lies between the sides and the distal end of the polygon and the periphery of the distal end of the paddle.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objectives and advantages thereof, may best be understood by reference to the following description of the presently preferred embodiments together with the accompanying drawings in which:

DETAILED DESCRIPTION OF THE PREFERRED EMBODIMENTS

An inductive charger coupling 1 according to a first embodiment of the present invention will be described.

Figure 3:
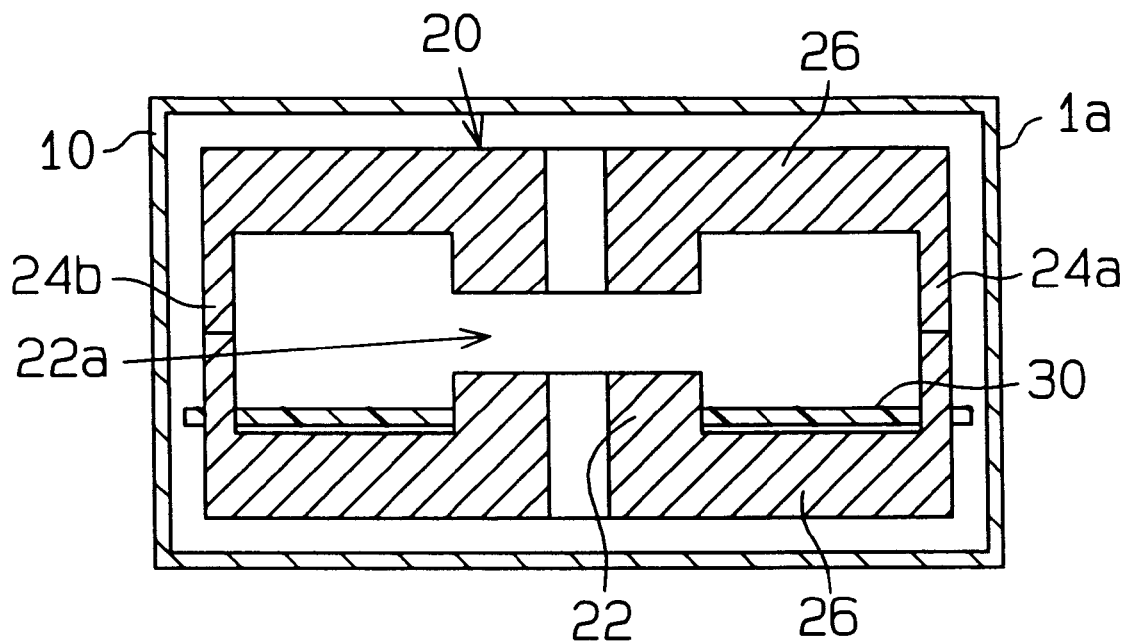
FIG. 3 is a cross sectional view taken along line 3—3 in FIG. 1.
Figure 4:
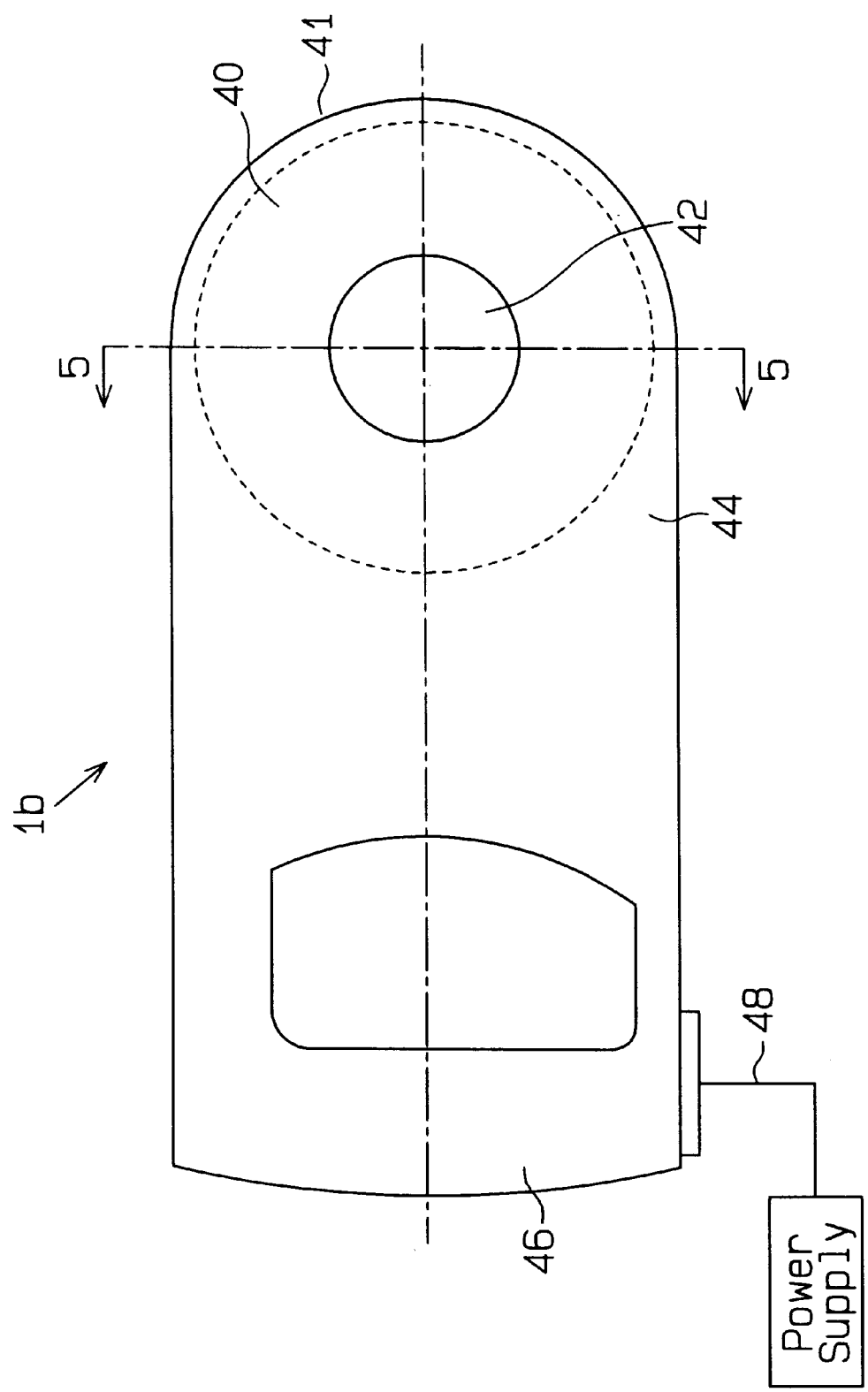
FIG. 4 is a plan view of a charging paddle of the inductive charger coupling of the first embodiment.
Figure 5:
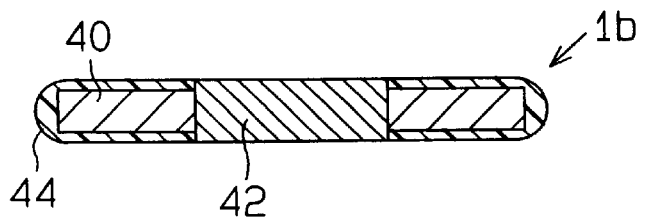
FIG. 5 is a cross sectional view taken along line 5—5 in FIG. 4.

The inductive charger coupling 1 (FIGS. 6 to 8) includes a charging receptacle 1a (FIGS. 1 to 3) and a flat charging paddle 1b (FIGS. 4 and 5). The paddle 1b supplies power, and the receptacle 1a receives power.

Figure 1:
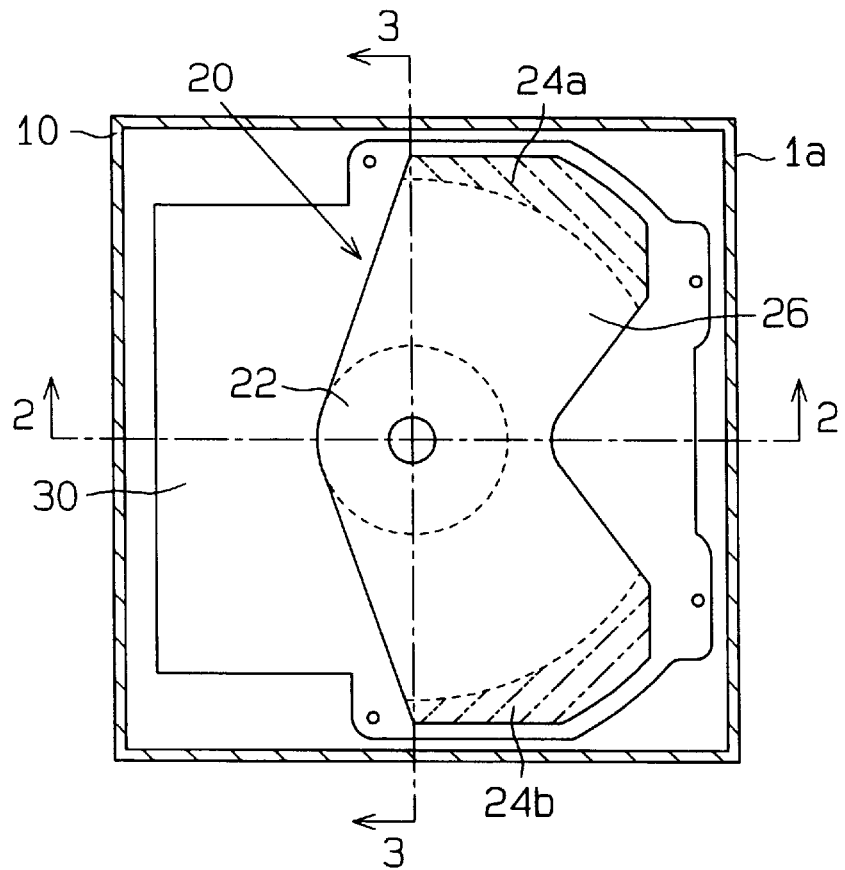
FIG. 1 is a cross sectional plan view of a receptacle of an inductive charger coupling according to a first embodiment of the present invention.
Figure 2:
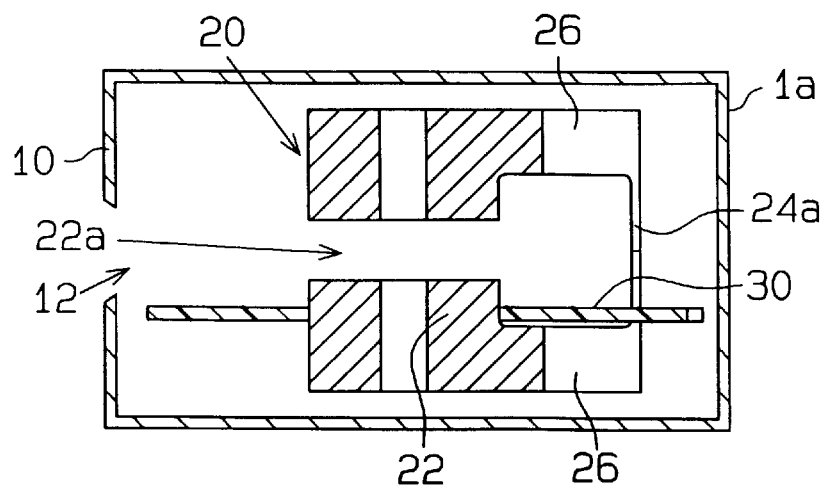
FIG. 2 is a cross sectional view taken along line 2—2 in FIG. 1.

As shown in FIG. 1, the receptacle 1a includes a housing 10, a secondary core 20 and a flat secondary coil assembly 30. The width Wi of the inductive charger coupling 1 (as measured vertically in FIG. 6), or the width of the housing 10, is about 180 mm. As shown in FIG. 2, the front wall (located on the left side of FIG. 2) of the housing 10 has an opening or slot 12 for receiving the paddle 1b.

The secondary core 20 is fixed to the housing 10 by brackets (not shown). As shown in FIG. 3, the secondary core 20 includes a right pillar 24a, a left pillar 24b, upper and lower bridge sections 26 and upper and lower supports 22. The upper bridge section 26 connects the upper end of the right pillar 24a and the upper end of the left pillar 24b. The lower bridge section 26 connects the lower end of the right pillar 24a and the lower end of the left pillar 24b. The pillars 24a, 24b and bridge sections 26 have predetermined thicknesses and widths for creating the desired amount of magnetic flux. Each support 22 is arranged centrally on the corresponding bridge section 26 to extend toward the opposite support 22. The supports 22 have a hollow cylindrical shape for producing a desired amount of magnetic flux, for reducing the weight of the secondary core 20 and for allowing easy installation of the flat secondary coil assembly 30 around the lower support 22 (details of the installation of the flat secondary coil assembly 30 will be described later). However, the shape of each support 22 is not limited to a cylindrical shape and can have any shape such as that of a solid cylinder or a prism. Furthermore, a gap 22a is provided between the supports 22.

The secondary coil assembly 30 includes a dielectric resin board and a circular coil. The resin board includes a main body and ribs. The main body has a center through hole and a pair of slits (not shown). When the secondary coil assembly 30 is installed around the lower support 22, the center through hole of the main body receives the lower support 22, and the slits of the main body receive the left and right pillars 24b, 24a, respectively. The ribs of the resin board extend from the main body for fixing the secondary coil assembly 30 to the housing 10 by screws. The circular coil of the secondary coil assembly 30 is embedded in the main body of the resin board around the lower support 22 and has a diameter of 125 mm. The circular coil includes a wound wire that is made of conductive material such as copper. The circular coil is electrically coupled to the battery through a cable and a rectifier (not shown).

Manufacturing of the secondary core 20 and the installation of the secondary coil assembly 30 on the secondary core 20 will now be described with reference to FIG. 3. The lower bridge section 26, the lower support 22, the lower half of the right pillar 24a and the lower half of the left pillar 24b are integrally formed from ferrite to produce the lower half of the secondary core 20. Likewise, the upper bridge section 26, the upper support 22, the upper half of the right pillar 24a and the upper half of the left pillar 24b are integrally formed from ferrite to produce the upper half of the secondary core 20. Then, the secondary coil assembly 30 is installed on the lower half of the secondary core 20, and the center through hole and the slits of the secondary coil assembly 30 receive the lower support 22 and the lower halves of the left and right pillars 24b, 24a as described above (alternatively, the secondary coil assembly 30 may be installed on the upper half of the secondary core 20 around the upper support 22). Then, the upper half of the secondary core 20 is connected to the lower half of the secondary core 20 to form the integral core structure.

As shown in FIGS. 4 and 5, the flat paddle 1b includes a core shaft 42, a circular primary coil 40, a dielectric resin coil case 44 and a grip 46. The primary coil 40 is wound around the core shaft 42 and is embedded in the coil case 44. A power supply line 48 extends from the paddle 1b for electrically coupling the paddle 1b to the external power supply. In the embodiment of FIG. 4, the distal end 41 of the paddle 1b has an arcuate shape. Therefore, the paddle lacks corners at its distal end. However, the shape of the distal end 41 is not required to be arcuate. The distal end 41 can have many shapes, such as an ellipsoidal shape or a polygonal shape, as long as the distal corners are rounded, recessed, removed, or beveled when the paddle is viewed from a plan perspective, like that of FIG. 4. In other words, the paddle is longer at its center than along its sides.

The core shaft 42 is made of ferrite. The axial length of the core shaft 42 (as measured in a direction perpendicular to the plane of the paddle 1b) is substantially the same as the distance between the supports 22. The primary coil 40 is manufactured by winding a wire of a conductive metal, such as copper, around the core shaft 42. The primary coil 40 has a diameter of 125 mm, which is substantially the same as that of the circular coil of the secondary coil assembly 30.

Figure 6:
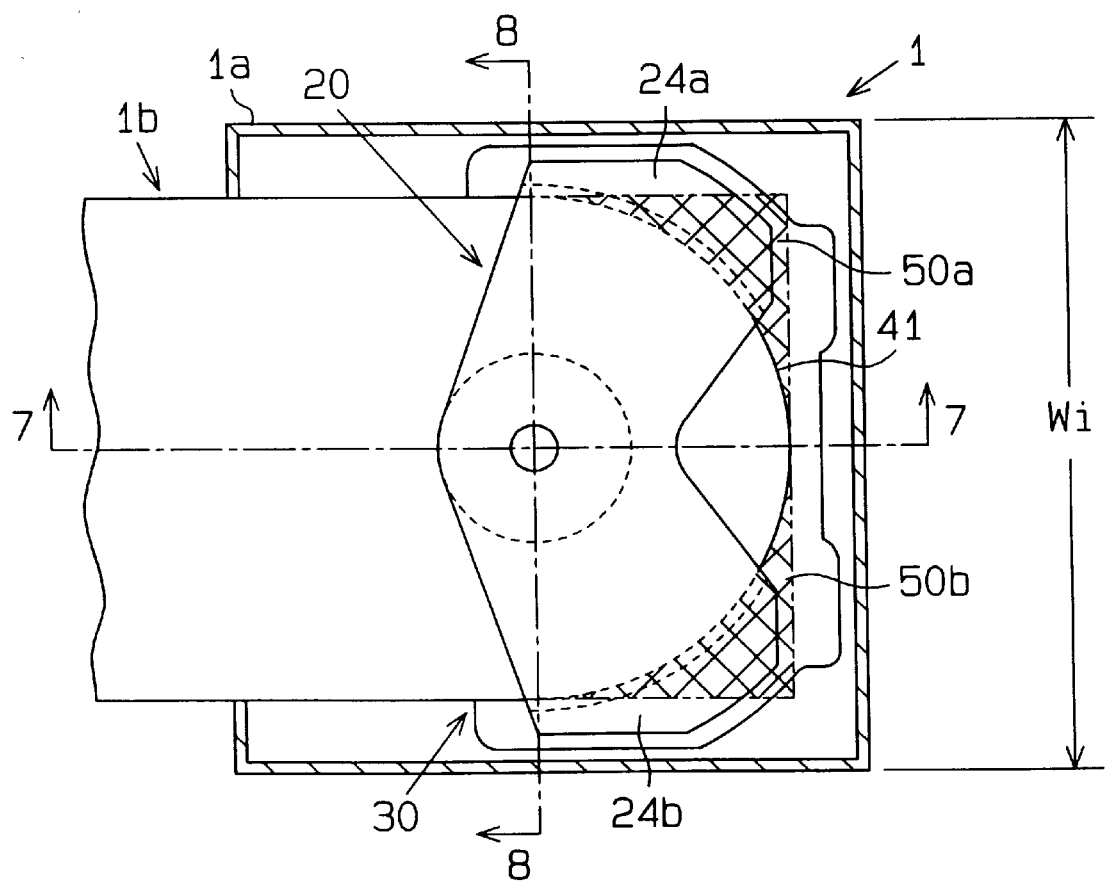
FIG. 6 is a cross sectional plan view of the inductive charger coupling of the first embodiment, showing the charging paddle plugged into the charging receptacle.
Figure 7:
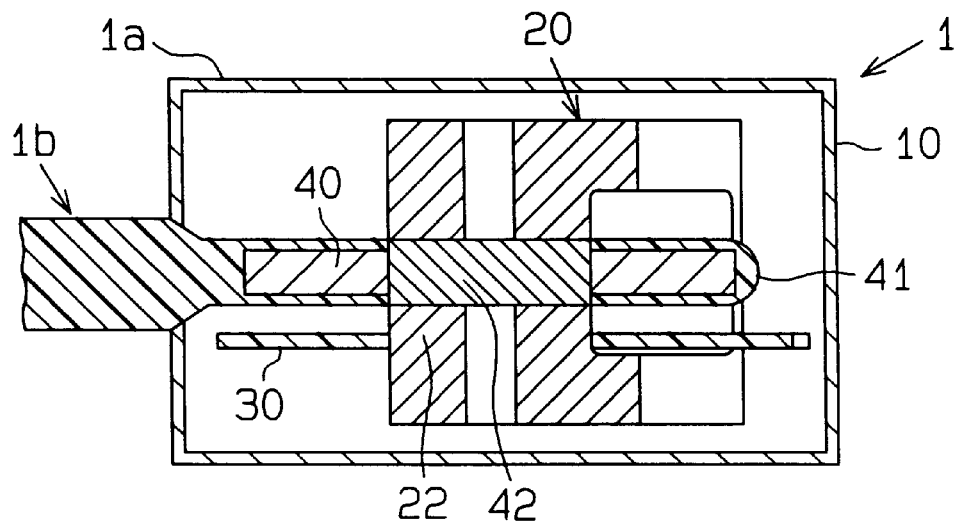
FIG. 7 is a cross sectional view taken along line 7—7 in FIG. 6.
Figure 8:
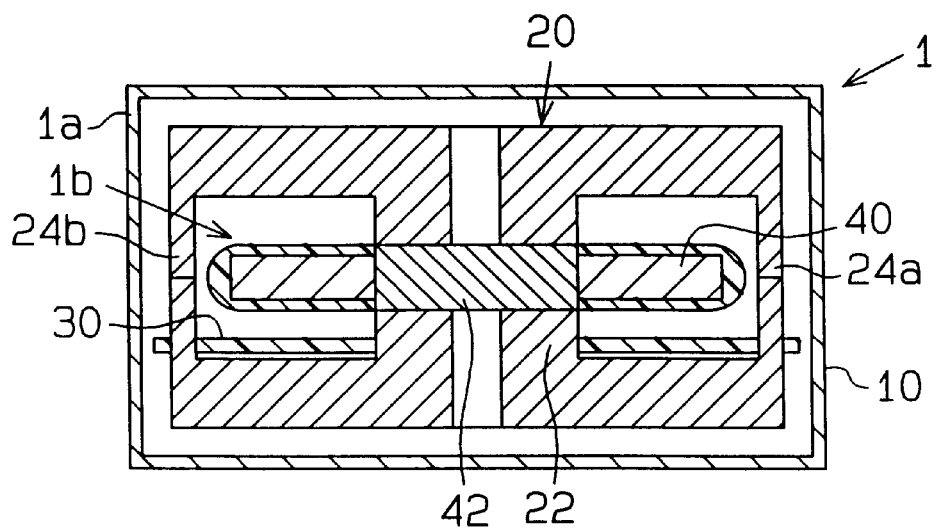
FIG. 8 is a cross sectional view taken along line 8—8 in FIG. 6.

To initiate charging of the battery, the distal end 41 of the paddle 1b is inserted into the receptacle 1a through the opening 12, so the core shaft 42 of the paddle 1b is held between the supports 22, as shown in FIG. 7. The primary coil 40 is coaxial with the secondary coil assembly 30, as shown in FIGS. 6 to 8. The supports 22 and the core shaft 42 are electromagnetically coupled with each other. Therefore, the core shaft 42 acts as a common core shaft for the primary coil 40 and the secondary coil assembly 30. When alternating current is supplied to the primary coil 40 of the paddle 1b from the external power supply, magnetic flux is created by the primary coil 40. The magnetic flux forms a magnetic circuit, which extends around the secondary core 20, to induce an electromotive force in the secondary coil assembly 30 for generating electric current. The electric current is supplied to the battery through the cable and the rectifier, which charges the battery.

As shown in FIG. 6, the left and right individual and separate pillars 24b, 24a are shaped and arranged to conform to the distal end 41 of the paddle 1b (on the right side of FIG. 6) in the housing 10. The cross sectional areas of these pillars 24b, 24a are clearly shown by hatching in FIG. 1. Furthermore, more than half of the cross sectional areas of the pillars 24a, 24b is located in two imaginary corner areas 50a, 50b shown by cross-hatching in FIG. 6. The imaginary corner areas 50a, 50b are defined within the boundaries of an imaginary polygon, in this case, a rectangle, and the periphery of the distal end section 41. The imaginary rectangle has three sides contacting the left side, the right side and the distal end of the paddle 1b, respectively, as shown in FIG. 6. In other words, each of the imaginary vacant corner areas 50a, 50b between the upper and lower bridges of the receptacle is bounded by the arcuate paddle periphery extending to the distal end 41 of the paddle 1b, and two imaginary lines. The first of the two imaginary lines extends along one of the respective sides of the paddle 1b. The second imaginary line is perpendicular to the longitudinal axis of the paddle 1b and to the first imaginary line.

Figure 13:
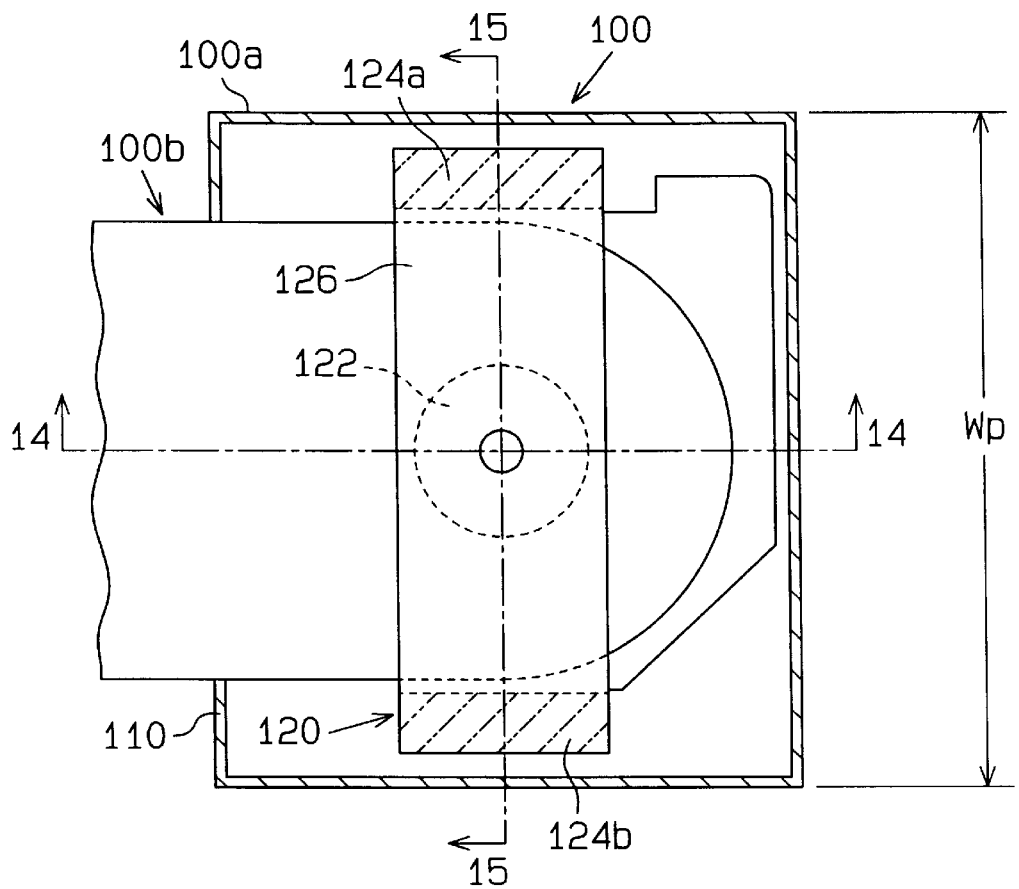
FIG. 13 is a plan cross sectional view of a prior art inductive charger coupling, showing the charging paddle plugged into the charging receptacle.
Figure 14:
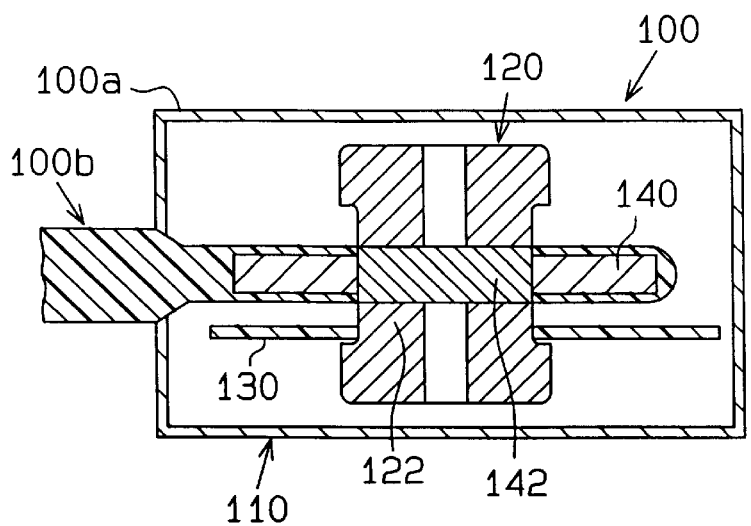
FIG. 14 is a cross sectional view taken along line 14—14 in FIG. 13.
Figure 15:
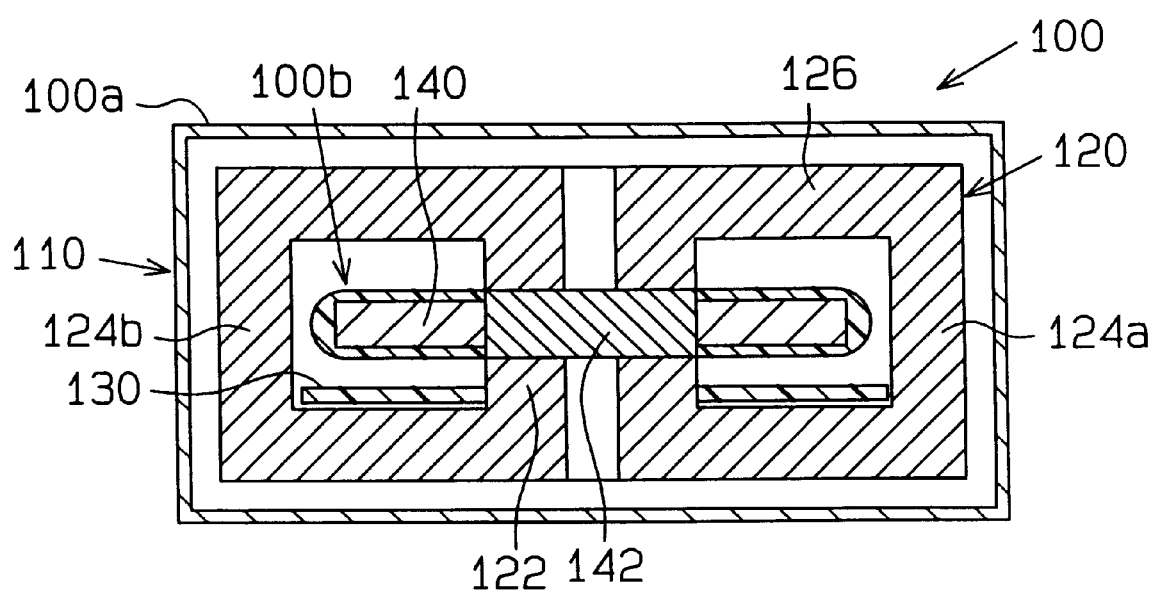
FIG. 15 is a cross sectional view taken along line 15—15 in FIG. 13.

Although the cross sectional area of each pillar 24a, 24b of FIG. 1 is greater than that of the corresponding pillars 124a, 124b of the prior art inductive charger coupling 100 of FIG. 13, the secondary core 20 of FIG. 1 is not as wide (160 mm) as the core 120 (180 mm) of the prior art inductive charger coupling 100. This is because more than half of the cross sectional area of each pillar 24a, 24b is located within the imaginary corner area 50a, 50b. Therefore, the width Wi of the inductive charger coupling 1 of the first embodiment is reduced to 180 mm, which is less than that of the prior art inductive charger coupling 100, resulting in a more compact inductive charger coupling 1.

An inductive charger coupling according to a second embodiment will now be described with reference to FIG. 9.

Figure 9:
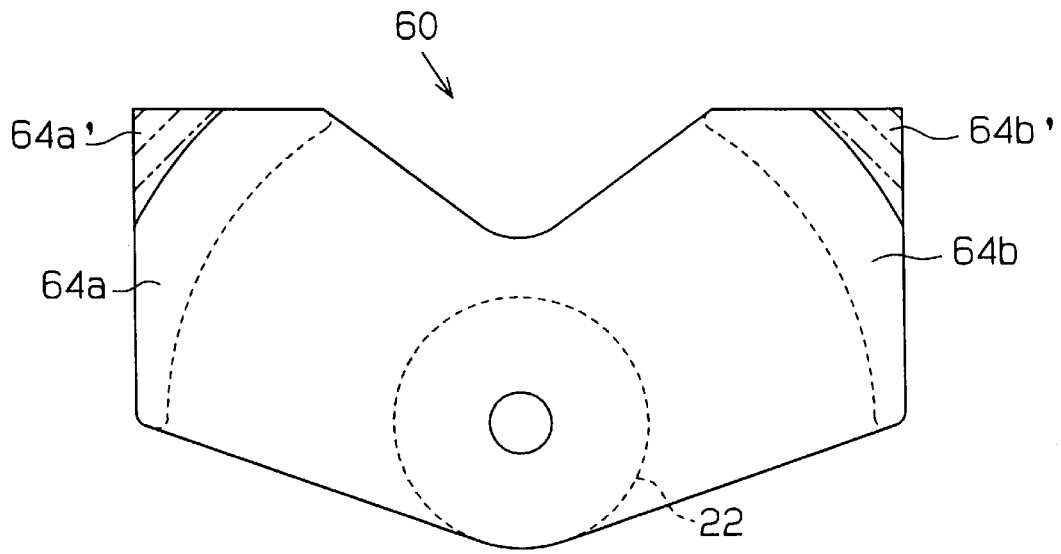
FIG. 9 is an enlarged plan view of a core of the inductive charger coupling according to a second embodiment of the present invention.

As shown in FIG. 9, the inductive charger coupling of the second embodiment differs from that of the first embodiment only in the shape of the pillars 64a, 64b. Each pillar 64a, 64b has an additional area 64a', 64b', which is added to the corresponding pillar 24a, 24b of the first embodiment.

The width of the secondary core 60 is the same as that of the secondary core 20 of the first embodiment. However, the cross sectional area of the secondary core 60 of the second embodiment is larger than that of the secondary core 20 of the first embodiment. As a result, the amount of magnetic flux of the secondary core 60 in the second embodiment is increased in comparison to the secondary core 20 of the first embodiment.

Figure 10:
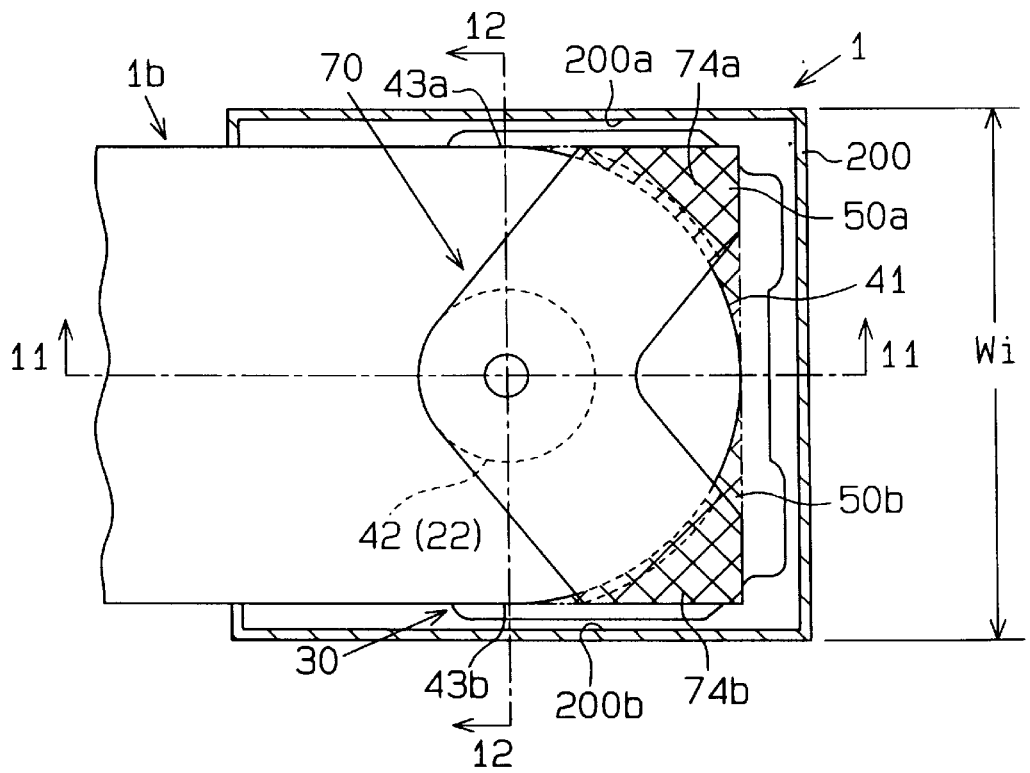
FIG. 10 is a plan cross sectional view of the inductive charger coupling according to a third embodiment of the present invention, showing the charging paddle being plugged into the charging receptacle.
Figure 11:
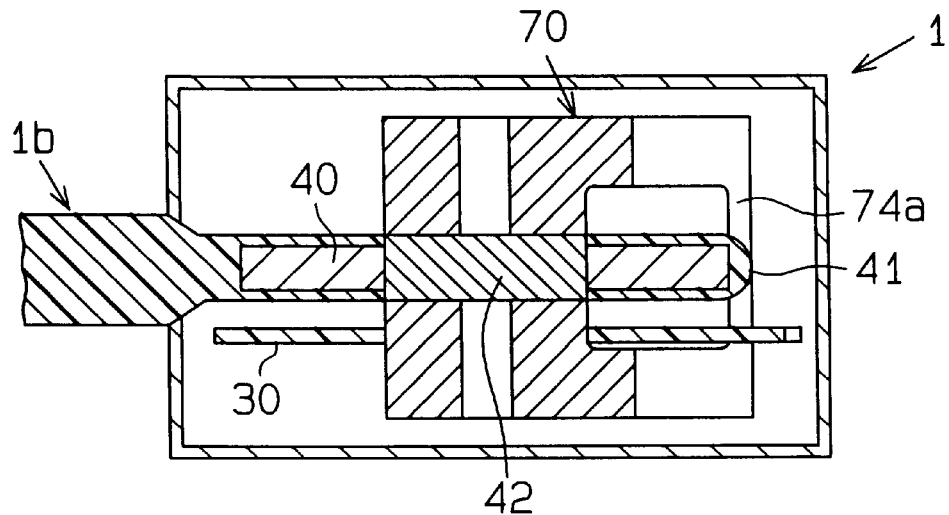
FIG. 11 is a cross sectional view taken along line 11—11 in FIG. 10.
Figure 12:
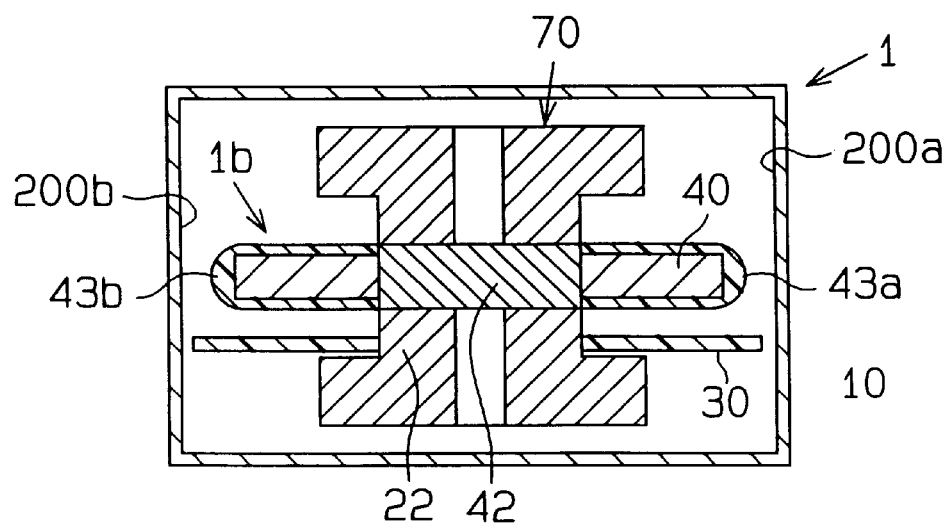
FIG. 12 is a cross sectional view taken along line 12—12 in FIG. 10.

An inductive charger coupling according to a third embodiment of the present invention will now be described with reference to FIGS. 10 to 12.

The inductive charger coupling of the third embodiment differs from those of the first and second embodiments only in the shapes of the secondary core 70 and the housing 200.

The secondary core 70 of the third embodiment is not as wide as the secondary cores 20, 60 of the first and second embodiments. The cross sectional area of the pillars 74a, 74b is entirely located within the imaginary corner area 50a, 50b. Thus, the housing 200 of the third embodiment has side walls 200a, 200b that are closer to the sides 43a, 43b of the paddle 1b than those of the housing 10 of the first embodiment. Therefore, the housing 200 of the third embodiment has a width Wi of 160 mm. Thus, the inductive charger coupling of the third embodiment is narrower than that of the first embodiment.

The first to third embodiments of the present invention can be modified as follows.

A guide mechanism for guiding the paddle 1b to a predetermined position in the receptacle 1a can be provided. This will allow easy insertion and correct positioning of the paddle 1b with respect to the receptacle 1a.

During charging of the battery, the secondary core 20, the secondary coil assembly 30 and the primary coil 30 radiate heat. Therefore, cooling devices such as a cooling fan and radiating fins for cooling these parts can be provided.

The inductive charger coupling of the present invention provides following advantages.

The pillars of the secondary core are arranged at the corners of the housing, so the width of the core is reduced without reducing the cross sectional areas of the pillars. As a result, the width of the housing is reduced, which reduces the size of the inductive charger coupling.

The inductive charger coupling of the present invention can be arranged in the motor compartment of compact automobiles. The inductive charger coupling of the present invention can be installed in a smaller area, so the other parts can be arranged in the motor compartment without crowding. This reduces the risk of malfunctions and facilitates maintenance.

Furthermore, as the size of the housing of the inductive charger coupling is reduced, the amount of material required for manufacturing the housing is reduced. As a result, the cost of the inductive charger coupling is reduced.

Therefore, the present examples and embodiments are to be considered as illustrative and not restrictive and the invention is not to be limited to the details given herein, but may be modified within the scope and equivalence of the appended claims.

What is claimed is:

1. An inductive coupling for connecting a battery to a power source comprising:

a generally planar charging paddle, wherein the paddle includes a primary core and a primary coil, the primary coil being wound around the primary core, wherein the primary coil is adapted to connect to an external power supply, and wherein the paddle has a proximal end, a distal end, a longitudinal axis, a top surface, a bottom surface, and first and second sides, wherein the first and second sides are farther from the longitudinal axis than are the top and bottom surfaces, and the paddle extends farther in the distal direction in a region near the longitudinal axis than along the sides, whereby an imaginary polygon is defined at the distal end of the paddle, such that a distal end of the polygon is perpendicular to the longitudinal axis of the paddle and contacts the distal end of the paddle, and a pair of sides of the polygon, which intersect the distal end of the polygon, are coextensive with the first and second sides of the paddle, respectively; and a receptacle for receiving the paddle to electrically couple the external power source with the battery, wherein the receptacle includes a secondary core and a secondary coil, the secondary coil being wound around the secondary core, wherein the secondary core engages the primary core when the paddle is plugged into the receptacle, the receptacle having a pair of pillars extending in a direction generally perpendicular to the paddle when the paddle is plugged in, wherein more than half of the cross sectional area of the pillars, when cut by a plane that includes the longitudinal axis of the paddle when the paddle is plugged in, lies within an area defined by the sides and the distal end of the polygon and the periphery of the paddle adjacent to the distal end of the paddle.

2. The inductive coupling according to claim 1, wherein the pillars are entirely located between the sides and the distal end of the polygon and the periphery of the paddle adjacent to the distal end of the paddle.

3. The inductive coupling according to claim 1, wherein the width of the secondary core, as measured in the side-to-side direction of the paddle when the paddle is plugged in, is substantially the same as the side-to-side dimension of the paddle.

4. The inductive coupling according to claim 1, wherein the distal end of the paddle has an arcuate shape.

5. The inductive coupling according to claim 1, wherein the secondary coil includes a pair of coaxial, hollow cylindrical supports, and wherein the paddle fits between the cylindrical supports when plugged in.

6. The inductive coupling according to claim 1, wherein the receptacle is installed in an automobile and is used to charge a battery in the automobile.

7. An inductive coupling for connecting a battery to a power source, the inductive coupling comprising:

a charging paddle including a primary core and a primary coil wound around the primary core, the primary coil being adapted to connect to an external power supply, the paddle having a proximal end, a distal end, a longitudinal axis that extends from the proximal end to the distal end, a top surface, a bottom surface, and first and second sides, wherein the first and second sides are farther from the longitudinal axis than are the top and bottom surfaces, and the paddle extends farther in the distal direction in a region near the longitudinal axis than along the sides such that a pair of individual and separate vacancies are provided at the respective sides of the paddle adjacent to the periphery of the paddle proximate to the distal end of the paddle; and a receptacle for receiving the paddle to electrically couple the external power source with the battery, wherein the receptacle includes a secondary core and a secondary coil, the secondary coil being wound around the secondary core, wherein the secondary core engages the primary core when the paddle is plugged into the receptacle, the secondary core including an upper part and a lower part, wherein the upper and lower parts are joined by a pair of individual and separate pillars whereby, when the paddle is plugged in, the pillars each extend in a direction generally perpendicular to the paddle and respectively occupy respective ones of said pair of vacancies and substantially conform to the shape of the distal end of the paddle to reduce the size of the coupling.

8. The inductive coupling according to claim 7, wherein the width of the secondary core, as measured in the side-to-side direction of the paddle when the paddle is plugged in, is substantially the same as the side-to-side dimension of the paddle.

9. The inductive coupling according to claim 7, wherein the distal end of the paddle has an arcuate shape.

10. The inductive coupling according to claim 7, wherein the secondary coil includes a pair of coaxial, hollow cylindrical supports, and wherein the paddle fits between the cylindrical supports when plugged in.

11. The inductive coupling according to claim 7, wherein the receptacle is installed in an automobile and is used to charge a battery in the automobile.

12. An inductive coupling for connecting a battery to a power source, the inductive coupling comprising:

a charging paddle providing a primary core and a primary coil each mounted on the paddle, the primary coil being wound around the primary core and adapted to connect to an external power supply, the paddle having a proximal end, a distal end, a longitudinal axis that extends from the proximal end to the distal end of the paddle, a top surface, a bottom surface, and first and second sides, wherein the first and second side are farther from the longitudinal axis than are the top and bottom surfaces, and the paddle has an arcuate end such that the center of the distal end of the paddle extends farther in the distal direction than the sides thereby providing a pair of vacancies at respective sides of the paddle adjacent to the periphery of the paddle proximate to the distal end of the paddle; and a receptacle for receiving the paddle to electrically couple the external power source with the battery, the receptacle including a secondary core and a secondary coil wound around the secondary core, wherein the secondary core engages the primary core when the paddle is plugged in to the receptacle, the secondary core including an upper part and a lower part between which the paddle is positioned when plugged in, the secondary core further including a pair of individual and separate pillars which join the upper and lower parts whereby, when the paddle is plugged in, the pillars each extend in a direction generally perpendicular to the paddle and respectively occupy the respective vacancies, and wherein the pillars each have an arcuate surface which substantially conforms to the shape of the distal end of the paddle to reduce the size of the coupling.

13. The inductive coupling according to claim 12, wherein the width of the secondary core, as measured in the side-to-side direction of the paddle when the paddle is plugged in, is substantially the same as the side-to-side dimension of the paddle.

14. The inductive coupling according to claim 12, wherein the distal end of the paddle has an arcuate shape.

15. The inductive coupling according to claim 12, wherein the secondary coil includes a pair of coaxial, hollow cylindrical supports, and wherein the paddle fits between the cylindrical supports when plugged in.

16. The inductive coupling according to claim 12, wherein the receptacle is installed in an automobile and is used to charge a battery in the automobile.

* * * * *